(12) United States Patent
Kanno et al.

(10) Patent No.: US 7,404,211 B2
(45) Date of Patent: Jul. 22, 2008

(54) SYSTEMS AND METHODS FOR PROTECTING A SERVER COMPUTER

(75) Inventors: Shin-ichi Kanno, Kanagawa-ken (JP); Masamichi Tateoka, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 750 days.

(21) Appl. No.: 10/669,710

(22) Filed: Sep. 25, 2003

(65) Prior Publication Data
US 2004/0064738 A1   Apr. 1, 2004

(30) Foreign Application Priority Data

Sep. 26, 2002  (JP)  ............... P2002-280289
Mar. 17, 2003  (JP)  ............... P2003-071238

(51) Int. Cl.
    *G06F 11/00* (2006.01)
(52) U.S. Cl. ............... 726/22; 726/23; 726/24; 726/25
(58) Field of Classification Search ........ 713/201, 713/22–25; 709/223–225; 726/22–25
    See application file for complete search history.

(56) References Cited

U.S. PATENT DOCUMENTS

| 6,212,640 | B1 * | 4/2001 | Abdelnur et al. ............ 726/2 |
| 6,751,668 | B1 * | 6/2004 | Lin et al. ............... 709/227 |
| 6,986,139 | B1 * | 1/2006 | Kubo .................... 718/105 |
| 7,107,619 | B2 * | 9/2006 | Silverman ............... 726/27 |
| 7,124,438 | B2 * | 10/2006 | Judge et al. ............. 726/22 |
| 7,131,140 | B1 * | 10/2006 | O'Rourke et al. ......... 726/11 |
| 2002/0138599 | A1 * | 9/2002 | Dilman et al. ........... 709/223 |
| 2002/0138643 | A1 * | 9/2002 | Shin et al. .............. 709/232 |
| 2003/0061306 | A1 | 3/2003 | Kanno et al. |
| 2003/0145236 | A1 | 7/2003 | Tateoka |
| 2004/0054924 | A1 * | 3/2004 | Chuah et al. ............ 713/201 |

FOREIGN PATENT DOCUMENTS

| JP | 2001-318899 | 11/2001 |
| JP | 2002-16633 | 1/2002 |
| JP | 2002-158660 | 5/2002 |

OTHER PUBLICATIONS

Notification of Reasons for Rejection issued by the Japanese Patent Office on Jan. 8, 2008, for Japanese Patent Application No. 2003-071238, and English-language translation thereof.
Sakaguchi et al., "Exclusive Devices to Prevent DDoS Attacks Appear on Market-Discern Attack Patterns and Interrupt Suspicious Communications," Nikkei Business Publications (Jul. 2, 2001), cover page and p. 15.

* cited by examiner

*Primary Examiner*—Kimyen Vu
*Assistant Examiner*—Baotran N To
(74) *Attorney, Agent, or Firm*—Finnegan, Henderson, Farabow, Garrett & Dunner , L.L.P.

(57) ABSTRACT

A server computer protection apparatus protects a server computer against DoS attacks, but allows access to the server. The server computer protection apparatus comprises a unit configured to calculate the load state of the server computer on the basis of the number of data requests made upon the server computer, and the number of data responses of the server responsive to the data requests, and for changing the rate of data requests to be transferred to the server, in accordance with the load state.

14 Claims, 10 Drawing Sheets

SYSTEMS AND METHODS FOR PROTECTING A SERVER COMPUTER

CROSS-REFERENCE TO RELATED APPLICATIONS

This application is based upon and claims the benefit of priority from the prior Japanese Patent Application No. 2002-280289, filed Sep. 25, 2002; and No. 2003-071238, filed Mar. 17, 2003, the entire contents of which are incorporated herein by reference.

BACKGROUND OF THE INVENTION

1. Field of the Invention

The present invention relates to a network system between client computers and server computers, and more particularly to a server computer protection apparatus which protects a server computer from illicit access that intentionally hampers server computer operations.

2. Description of the Related Art

In recent years, client/server systems, which comprise unspecified or specified client computers connected to one or more server computers via networks such as wide area networks, for example, the Internet, or local area networks, have been utilized in order to supply data from the server in compliance with requests made by the clients.

Packets which include transmission data reconstructed into a predetermined size with destination information affixed thereto, are generally utilized as the format of data which flows through a network such as the Internet. The packet comprises a header and a data body. The header bears an IP (Internet Protocol) address, in the case of Internet, and Internet Protocol (IP) address, which indicates the computer which transmitted the packet, and an address, for example, and IP address, of a computer which is the destination of the packet.

Currently, any system connected to such network increasingly undergo attacks over the network. Such attacks are intend to cause systemic failures. One such attacking method is a Denial of Service ("DoS") attack. A DoS attack is an attack whereby a large quantity of access requests are simultaneously made upon a server computer by one client. The large quantity of access requests hampers the availability of the server and makes service substantially impossible.

This attacking method is hard to distinguish from an access request made by a legal client which does not intend to attack the system. Therefore, it is difficult to avoid the attack on the server side. In some cases, the server undergoes DoS attacks from a plurality of clients. In this case, the DoS attack is called a Distributed Denial of Service attack or DDoS attack.

When a server receives a large quantity of requests which exceed the processing ability of the server, the server's resources for communication processing, for example, memory areas and line bandwidths, are successively reserved for the respective large quantity of requests until the server's resources finally become insufficient. As a result, the server fails to respond to the request from a legal client not intending interference, or communication between the client and server stagnates seriously.

Heretofore, a conventional server computer protection apparatus has been arranged between the server and the network in order to exclude the attacks. The server computer protection apparatus processes only access requests, which are repeated a number times, as a legal access request from a legal client. Alternatively, the server computer protection apparatus processes access requests from a client, which has already given legal access, as a legal access request, and annuls packets as to the other access requests made by example.

Such a method, however, has the problem that, in a case where the client, which intends the attack, makes a large quantity of similar access requests, the attack cannot be prevented by the conventional server computer protection apparatus.

Furthermore, even when the above problem has been solved, the conventional server computer protection apparatus is still unsatisfactory. For example, when a legal client makes a large quantity of access requests, the clients access requests are judged as a DoS attack. Thus, in the convention protection apparatus legal requests are sometimes regarded as illicit access in spite of being legal. In such a case, the legal client's connection is cut off, and hence, the client's business is impeded.

SUMMARY OF THE INVENTION

The present invention is direct to a server computer protection apparatus and a server computer protection method which can protect a server against attacks from unspecified clients, but which allow access to a client that is legally accessing the server.

According to an aspect related to the present invention, there is provided a server computer protection method and apparatus, the method comprising: accepting data requests sent from client computers, as proxy for the server computer; measuring a number of data requests which have arrived from said client computers within a predetermined time period; measuring a number of responses which have been made from said server computer to said client computers within the predetermined time period; obtaining a load state of said server computer by using the number of the data requests and the number of the responses; and changing a rate of the number of data requests based on the obtained load state.

According to other aspect related to the present invention, there is provided a server computer protection method and apparatus, the method comprising: accepting data requests sent from client computers, as proxy for the server computer; receiving from said server computer, information on a processing situation of said server computer; obtaining a load state of said server computer from the processing situation information; and changing a rate of a number of data requests based on the load state.

Additional advantages of the invention will be set forth in part in the description which follows, and in part will be obvious from the description, or may be learned by practice of the invention. The advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several aspects of the present invention and together with the description, serve to explain the principles of the invention.

DETAILED DESCRIPTION OF THE INVENTION

Reference will now be made in detail to aspect related to the present invention, examples of which are illustrated in the accompanying drawings. Wherever possible, the same reference numbers will be used throughout the drawings to refer to the same or like parts.

Figure 1:
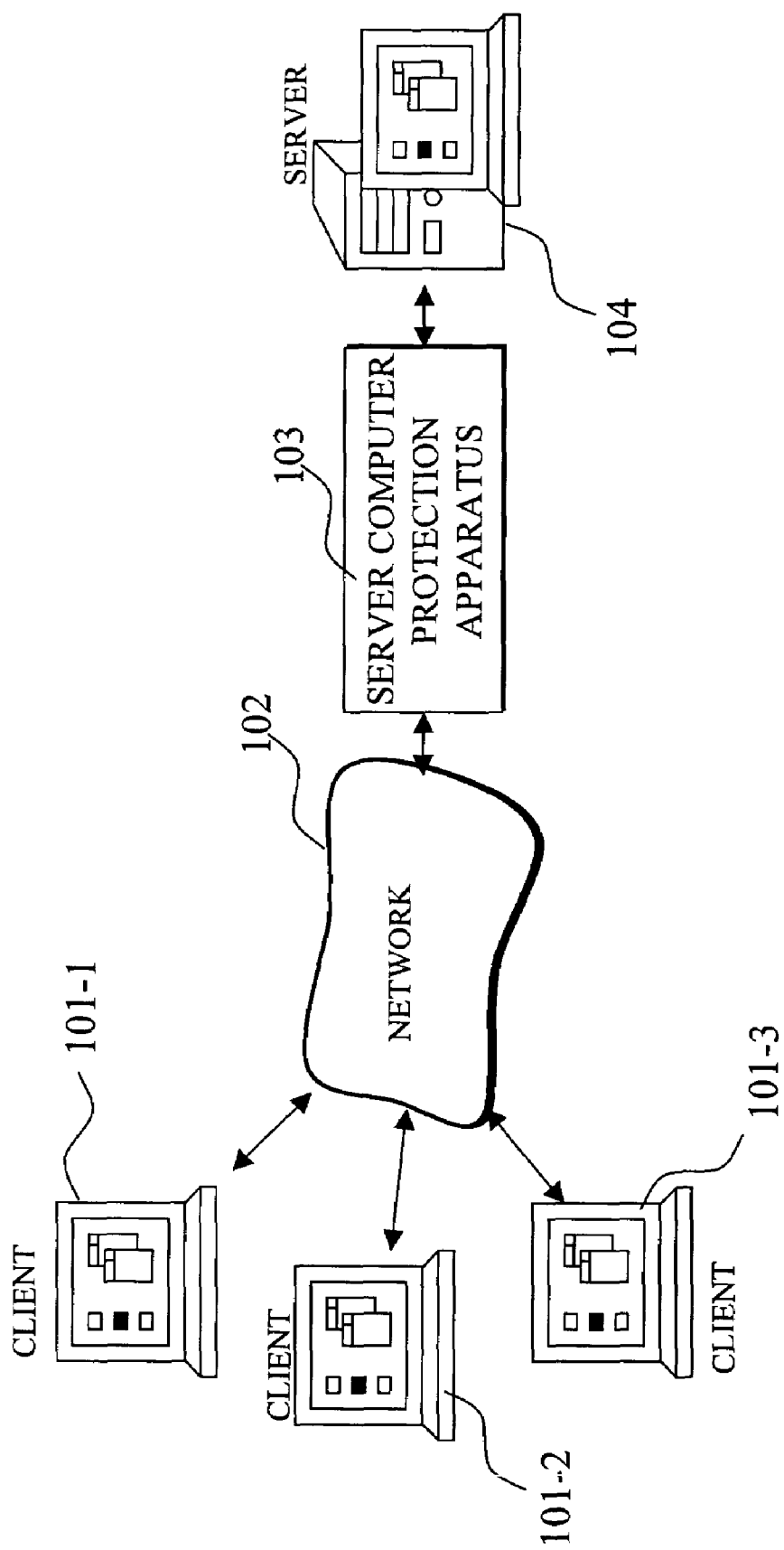
FIG. 1 is a diagram showing an example of a network architecture to which a server computer protection apparatus consistent with an aspect related to the present invention is applied.

FIG. 1 shows an example of a network architecture to which a server computer protection apparatus consistent with an aspect related to the present invention is applied. The network architecture comprises clients 101-1, 101-2, 101-3, which are computers running applications utilized by users, a network 102, for example, the Internet, and a server computer protection apparatus 103. The network architecture also comprises a server 104, which is a computer that receives, through server computer protection apparatus 103, requests for data that are required by the applications utilized by each client 101, and which transmits the requested data through server computer protection apparatus 103 to each client 101. Thus, the network architecture constitutes a server/client network system wherein clients 101 request server 104 to transmit data necessary for processes and the server 104 transmits the data in response to such requests. All communication between clients 101 and server 104 is performed through server computer protection apparatus 103.

Figure 2:
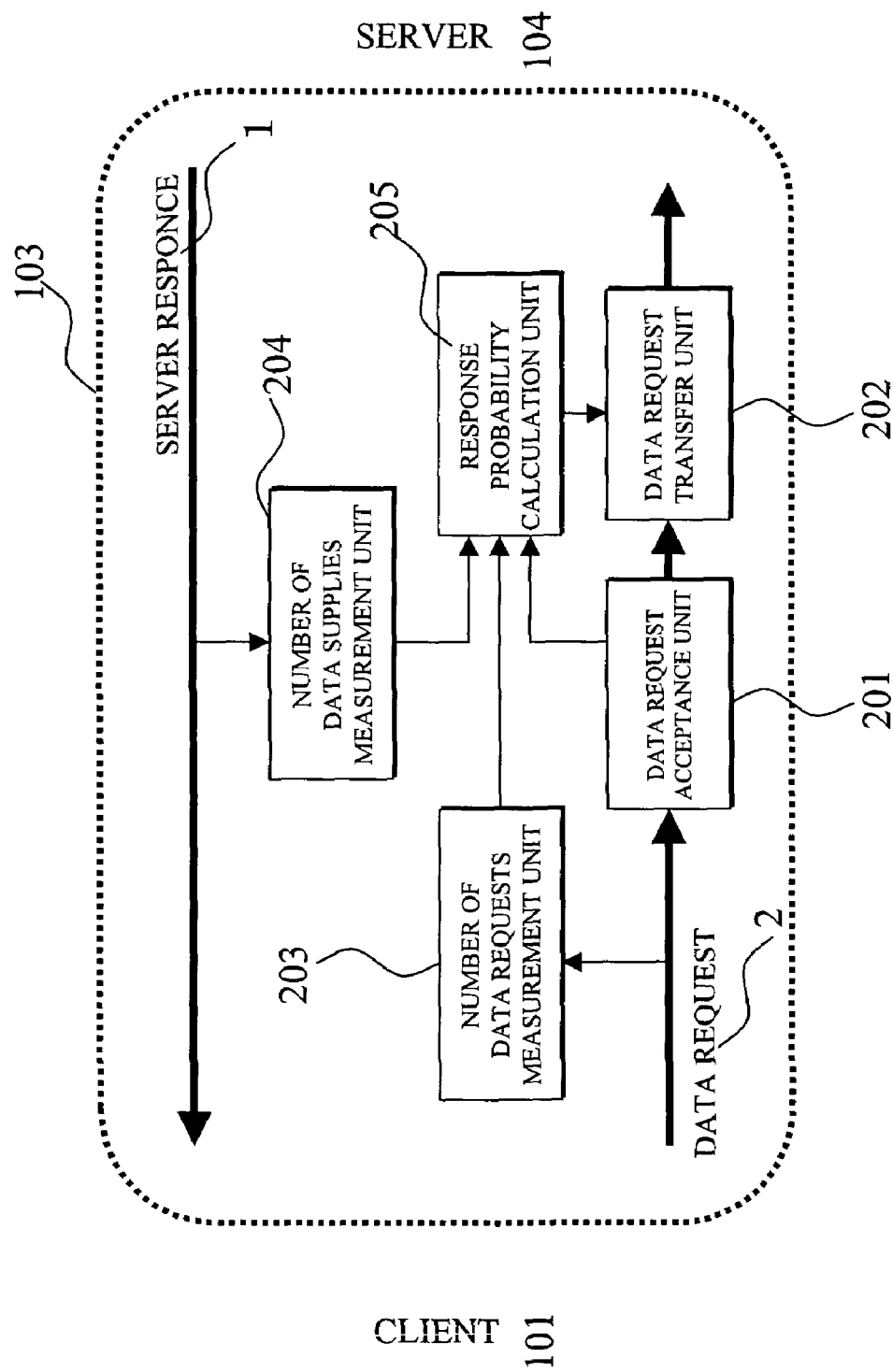
FIG. 2 is a block diagram showing server computer protection apparatus consistent with an aspect related to the present invention.

FIG. 2 shows an example of server computer protection apparatus 103 consistent with an aspect related to the present invention. Server computer protection apparatus 103 includes a data request acceptance unit 201, a data request transfer unit 202, a "number of data requests" measurement unit 203, a "number of data supplies" measurement unit 204, and a response probability calculation unit 205.

Figure 3:
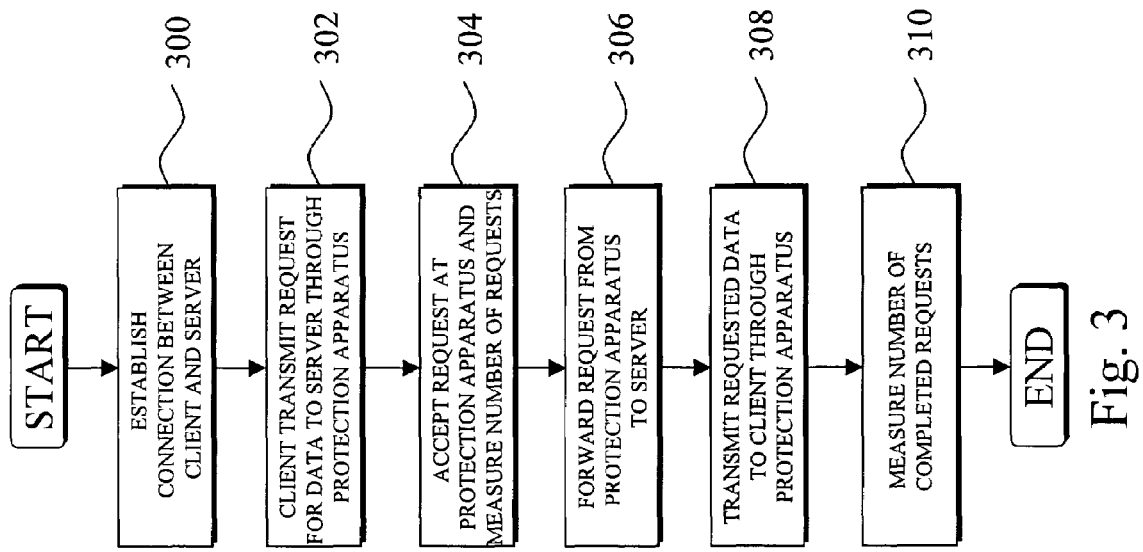
FIG. 3 is a flow chart showing an example of an operating flow of the server computer protection apparatus shown in FIG. 2.

FIG. 3 illustrates the flow of server computer protection apparatus 103 consistent with an aspect of the present invention. First, client 101 establishes a connection with server 103 (stage 300). After client 101 has established a connection with server 104 through server computer protection apparatus 103, client 101 transmits a request for data necessary for a process to the server 104 though server computer protection apparatus 103 (stage 302). On this occasion, data request acceptance unit 201 accepts the data request, and the number of requests accepted is measured by "number of data requests" measurement unit 203, or request measurement unit 203 (stage 304).

Then, the request accepted by data request acceptance unit 201 is transferred toward server 104 by data request transfer unit 202 (stage 306). In response, server 104 transmits the data corresponding to the transferred request, toward client 101 which made the request through the server computer protection apparatus 103 (stage 308). On this occasion, "number of data supplies" measurement unit 204, or response measurement unit 204, included in server computer protection apparatus 103 measures the number of the completions of the accepted requests transmitted by server 104 (stage 310). That is, when all responses to the clients 101 have been completed, the number of accepted requests as measured by "number of data requests" measurement unit 203 agrees with the number of completed requests as measured by "number of data supplies" measurement unit 204.

A case is considered in which the number of accepted requests as measured by "number of data requests" measurement unit 203 is larger than the number of completed requests as measured by "number of data supplies" measurement unit 204. The number of accepted requests being larger than the number of completed requests signifies that the processing of server 104 for the accepted requests is late which signifies a heavy processing load. As the number of accepted requests increases more than the number of completed requests, the response of server 104 delays even more. In turn, all services offered by the server 104 might stop due to a lack of resources. This event is the same as when server 104 is under a DoS attack from client 101. In order to avoid the shutdown of server 104, the administrator of server 104 must promptly stop requests which are transmitted from clients 101 to server 104.

However, assuming that clients 101 are merely making legal data requests until requests are stopped, the processes of the applications activated in clients 101 are interrupted or disabled by the determination of a required shutdown.

In order to reduce interruption as stated above, response probability calculation unit 205 calculates a response probability on the basis of the difference between the number of accepted requests and the number of completed requests, at least, each time an request is given. Subsequently, response probability calculation unit 205 supplies the response probability to data request transfer unit 202. The "response probability" termed here signifies the ratio of the number of data responses made within a predetermined time period by server 104, to the number of data requests accepted from clients 101 within the predetermined time period. When the value of the ratio is large, data request transfer unit 202 increases the number of data requests which are to be transferred to server 104 within the predetermined time period, among the data requests accepted within the predetermined time period. Conversely, when the ratio is small, data request transfer unit 202 decreases the number of data requests which are to be transferred to server 104 within the predetermined time period.

Data request acceptance unit 201 annuls data requests which are not transferred by data request transfer unit 202 because the number of requests to be transferred within the predetermined time period has been decreased. Alternatively, data request acceptance unit 201 can retain the data requests. In the case where the data requests are retained without being annulled, a constituent for transferring the retained data requests asynchronously to new data requests is required.

As described above, when the difference between the number of accepted requests and the number of completed requests becomes small, response probability calculation unit 205 judges the load of server 104 is light, and response probability calculation unit 205 calculates the response probability to be high. In contrast, when the difference between the numbers of accepted and completed requests becomes large, response probability calculation unit 205 judges the load of server 104 is heavy, and response probability calculation unit 205 calculates the response probability to be low. That is, response probability calculation unit 205 may also be referred to as a server load calculation unit.

The process provides a server computer protection apparatus which relaxes the influence of the DoS attack as a burden on the server and shuts it down, and does not stop the process of the client.

Incidentally, regarding the number of accepted requests in "number of data requests" measurement unit 203 and the number of completed requests as measured by "number of data supplies" measurement unit 204, only a differential value may well be held by, for example, adding the former requests and subtracting the latter requests. Server computer protection apparatus 103 permits the comparison of both the sorts of requests.

Figure 4:
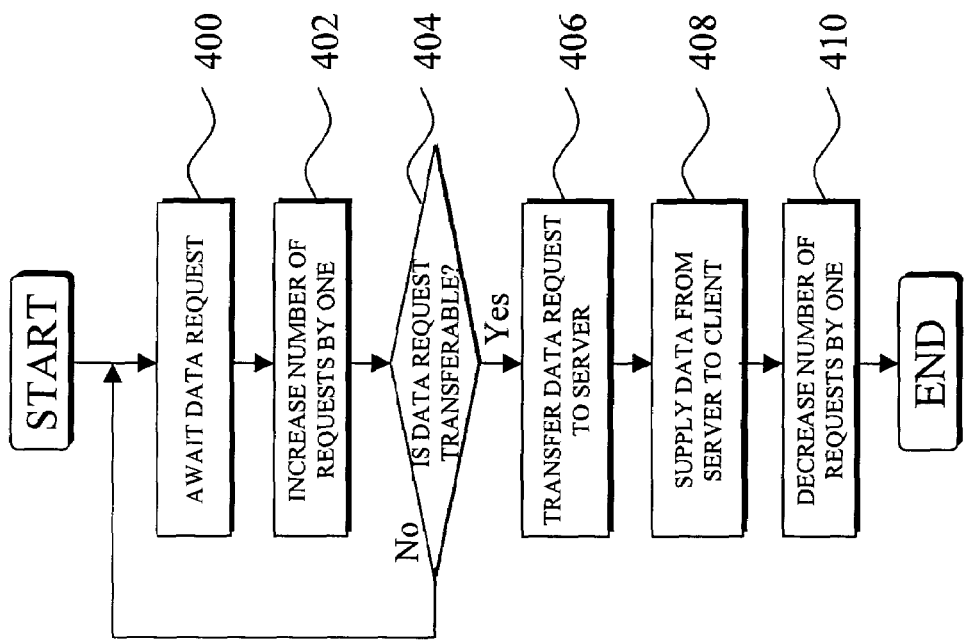
FIG. 4 is a flow chart showing an example of the operating flow of the server computer protection apparatus shown in FIG. 2.

FIG. 4 shows an example of the operating flow of the server computer protection apparatus consistent with an aspect related to the present invention.

After the connection has been established from client 101 to server 104 through server computer protection apparatus 103, server computer protection apparatus 103 awaits a data request from the client 101 toward the server 104 (stage 400). When the request for data has been made, "number of data requests" measurement unit 203 increases the number of accepted requests as held in the response probability calculation unit 205 by one (stage 402).

Next, the data request from client 101 as accepted by data request acceptance unit 201 is judged as to whether or not it may be transferred to server 104 by data request transfer unit 202 (stage 404). In the judgment at the stage 404, the number of accepted requests which are not completed yet is used.

As the number of data responses within a predetermined time period is closer to the number of data requests accepted within the predetermined time period, that is, as the number of uncompleted accepted requests is small, server computer protection apparatus 103 judges that the load of server 104 is lighter. Conversely, as the number of data responses within the predetermined time period is smaller than the number of data requests accepted within the predetermined time period, that is, as the number of uncompleted accepted requests is large, server computer protection apparatus 103 judges that the load of server 104 load is heavier. In a case where the load on this occasion is extraordinarily heavy, server computer protection apparatus 103 can judge that server 104 may be under a DoS attack.

As stated above, the number of uncompleted accepted requests can be adopted as the load state of server 104 for the decision of stage 404. This signifies that the number of uncompleted accepted requests is also usable for discriminating if server 104 is under a DoS attack. Thus, at stage 404, whether or not the new data request from client 101 may be transferred is judged in accordance with the number of uncompleted accepted requests. When the number of uncompleted accepted requests is small, server 104 can afford to respond, and, server computer protection apparatus 103 judges that the new data request can be transferred. Conversely, when the number of uncompleted accepted requests is larger, server 104 might be under the DoS attack, and, server computer protection apparatus 103 judges that the new data request may need to be annulled.

Further in addition to accepted and completed responses, criteria explained below can be included in probability calculation unit 205 calculation of the response probability for data requests that are to be transferred by data request transfer unit 202.

The processing load of server 104 and the occupation of the communication line can also be used for judging that server 104 may possibly be under a DoS attack. Since information indicating a data amount is affixed to communication data from client 101, the data amount of the data response of server 104 to a data request from the client 101 can be measured by "number of data supplies" measurement unit 204. If the responsive data amount is large, server 104 expends a high cost in generating response data, i.e., more processing and resource allocation. Moreover, a time period to communicate the response data lengthens, and the occupation time of a communication line in the network increases.

If this criterion is utilized, the data amount of the data response is considered in the judgment at stage 404 as shown in FIG. 4 in which server computer protection apparatus 103 judges whether or not the data request from client 101 as accepted by data request acceptance unit 201 may be transferred to server 104 by data request transfer unit 202.

That is, at stage 404, server computer protection apparatus 103 judges whether or not the new data request from client 101 may be transferred in accordance with the data amount of the data response. When the data amount is small, server 104 can afford to respond, and, therefore, server computer protection apparatus 103 judges that the new data request can be transferred. Conversely, when the data amount is large, server 104 might be under a DoS attack and, therefore, server computer protection apparatus 103 judges that the new data request may need to be annulled.

Data requests and data responses to them by server 104 are respectively endowed with corresponding sequence numbers. It is therefore possible to specify which of the data requests a certain data response corresponds to. As another criterion, this information can be included in probability calculation unit 205 calculation of the response probability for data requests that are to be transferred by data request transfer unit 202.

In this case, it is assumed that server 104 has responded to a certain data request from client 101. Assuming that an acknowledgment for the data response has not thereafter been obtained from client 101 for a predetermined time period, server 104 judges that the pertinent data response has not arrived at client 101, and server 104 attempts to resend the data response. As stated above, "number of data supplies" measurement unit 204 can specify which of the data requests the resent data response corresponds.

By considering this criterion, server computer protection apparatus 103 enables server 104 to reliably communicate with client 101, and determine when client 101 intentionally sends back no acknowledgment. In such a case, server 104 repeats resending limitlessly, and in turn, server 104 is burdened with a useless processing load. Simultaneously, server 104 ties up the communication line on account of the useless resending. Thus, server computer protection apparatus 103 can judge that server 104 may possibly be under a DoS attack.

If this criterion is utilized, the number of times of resending of the data response is considered in the judgment at that stage 404 as shown in FIG. 4 in which server computer protection apparatus 103 judges whether or not the data request from client 101 as accepted by data request acceptance unit 201 may be transferred to server 104 by data request transfer unit 202.

That is, at stage 404, whether or not the new data request from client 101 may be transferred is judged in accordance with the number of times of resending of the data response. When the number of times of resending is large, the possibility of a DoS attack against server 104 is higher, and server computer protection apparatus 103 can judge that the new data request may need to be annulled.

As mentioned above, data request acceptance unit 201 accepts the data request from client 101 as proxy for server 104. When the connection with server 104 as requested by client 101 has been wrongfully cut off, data request acceptance unit 201 can detect the wrongful cutoff. The "wrongful cutoff" signifies cutoff based on the detection of the fact that a normal communication can no longer be kept due to the transmission flow, for example, an abnormal command which does not conform to a protocol for use in communication. Also, "wrongful cutoff" can include the reception of a one-sided forced cutoff request or the like from client 101.

When server 104 receives an abnormal command, flow, or forced cutoff request, the server/client network must execute a recovery processes of communication resources because the received item is unexpected data. In the presence of any renewed application which is activated in server 104, the server/client network also must perform a renewal cancellation process such as roll-back because of the recovery process. These processes often require server 104 to endure heavy loads. When such abnormal communications are repeated, the load of server 104 increases, and the processing efficiency of the server 104 decreases drastically. Also in this case, server computer protection apparatus 103 can judge that server 104 may possibly be under a DoS attack.

The number of times of the abnormal communications is considered in the judgment at stage 404 as shown in FIG. 4 in which server computer protection apparatus 103 judges whether or not the data request from client 101 as accepted by data request acceptance unit 201 may be transferred to server 104 by data request transfer unit 202.

That is, at stage 404, whether or not the new data request from client 101 may be transferred is judged in accordance with the number of times of the abnormal communications. As the number of times is large, the possibility of the DoS attack against server 104 is higher, and, therefore, server computer protection apparatus 103 can judge that the new data request is to be annulled.

Accordingly, by setting several criteria as described above, server computer protection apparatus can effectively prevent a DoS attack.

In another example, in the calculation of the response probability by response probability calculation unit 205, response probability calculation unit 205 can include a response probability memory and consider a value stored in this memory, as described below.

Response probability calculation unit 205 judges the load of server 104 on the basis of information items which are acquired from "number of data requests" measurement unit 203, "number of data supplies" measurement unit 204, and data request acceptance unit 201. In this example, a calculated value is not directly converted into the load situation of server 104 for judgment, but the value is referenced to the value stored in the response probability memory of response probability calculation unit 205.

In the calculations of server computer protection apparatus 103, the values obtained from the respective measurement units have been collectively converted into values which indicate load levels of "0" to "10". Depending upon the values obtained from the respective measurement units, the load level of server 104 might violently change from "0" to "10", and the response probability to be calculated can greatly fluctuate.

Therefore, the values obtained from the respective measurement units are collectively converted into a value which falls within a range of ±2. Subsequently, response probability calculation unit 205 adds the value collectively obtained to the value which is stored in the response probability memory. Then, the value fluctuates only within the range of ±2 by one time of measurement, and server computer protection apparatus 103 can suppress the great fluctuation of the response probability as in the above example based on the assumption that the response probability memory holds the values of "0" to "10".

Assuming that the fluctuation of the response probability proceeds too rapidly, the load on server 104 is not constant, and server 104 sometimes becomes unstable.

Accordingly, the aforementioned range of the values which are held in the response probability memory, and the range of the collective values of the values obtained from the respective measurement units are appropriately determined, whereby the fluctuation of the number of data requests arriving at server 104 from client 101 can be relaxed to protect server 104.

Referring again to FIG. 4, when server computer protection apparatus 103 has judged that the new data request from client 101 is to be transferred to server 104, data request transfer unit 202 transfers this data request to server 104 (stage 406). In contrast, when server computer protection apparatus 103 has judged that the new data request is not to be transferred, this data request is annulled from within data request acceptance unit 201, and a new data request from client 101 is awaited again (stage 400).

When the data request from client 101 has been transferred to server 104, server 104 subsequently issues a response to this data request, and hence, server computer protection apparatus 103 transfers the response to client 101 (stage 408).

Finally, the number of completed requests is measured in accordance with the response by "number of data supplies" measurement unit 204, and the number of accepted requests as held in response probability calculation unit 205 is decreased by one (stage 410). If the connection from client 101 to server 104 is maintained, a similar operating flow is repeated again so as to await a new data request from client 101 toward server 104 (stage 400).

According to the server computer protection method based on such a flow, the server computer protection apparatus relaxes the influence of the DoS attack as burdens on the server and shuts it down, and does not stop the process of the client.

Figure 5:
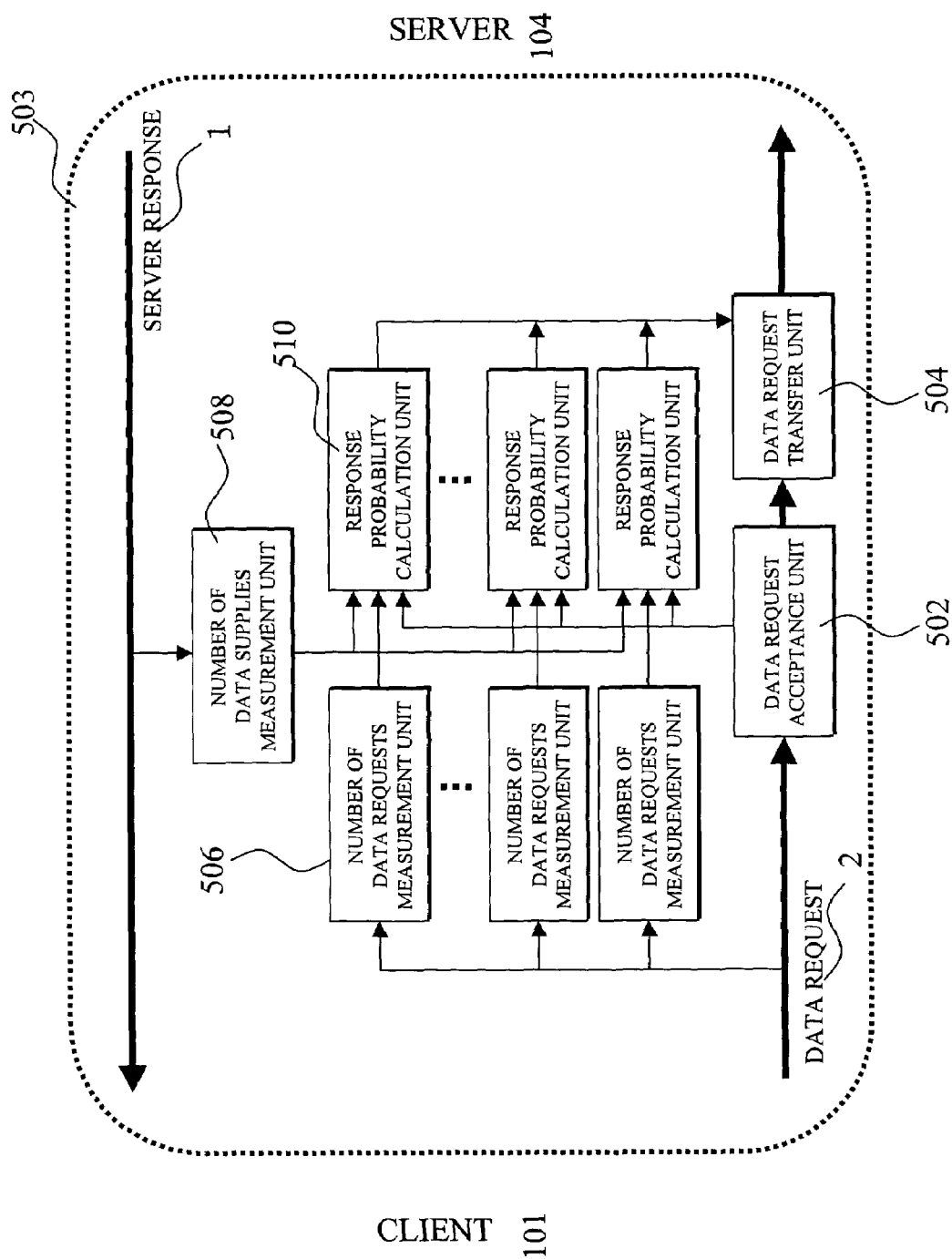
FIG. 5 is a block diagram showing an example of the construction of a server computer protection apparatus consistent with an aspect related to the present invention.

In another aspect related to the present invention, a server computer protection apparatus can be configured to separately maintain information of each client. FIG. 5 shows an example of the construction of the server computer protection apparatus 503 consistent with this aspect which is utilized in the network architecture show in FIG. 1. Server computer protection apparatus 503 includes a data request acceptance unit 502, a data request transfer unit 504, "number of data requests" measurement units 506, a "number of data supplies" measurement unit 508 and response probability calculation units 510. Server computer protection apparatus 503 differ from server computer protection apparatus 103 shown in FIG. 2 in that the apparatus includes a plurality of "number of data requests" measurement units 506 and response probability calculation units 510. Each measurement unit processes data request transmitted from each of clients 101 (for example, clients 101-1, 101-2, 101-3), in correspondence with the respective client.

In order to separately execute the processes of the respective clients, it is necessary to discriminate which of the clients have transmitted the requests to be processed. The discrimination can be achieved by referring to IP addresses in the header information of packets that are contained in the data requests transmitted from the respective clients which indicate transmission sources. Likewise, the client 101 destination of a server 104 response can be discriminated by referring to an IP address in the header information of packets that are contained in the server response which indicates a destination.

The components of server computer protection apparatus 503 function similar to the component of server computer protection apparatus 103.

Figure 6:
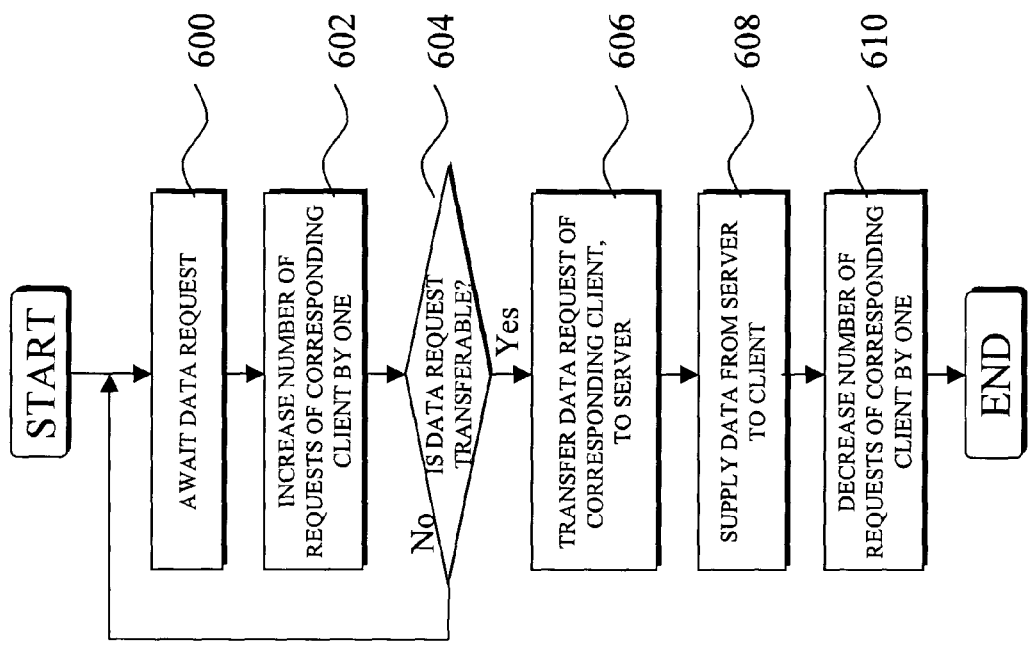
FIG. 6 is a flow chart showing an example of the operating flow of the server computer protection apparatus shown in FIG. 5.

FIG. 6 shows an example of the operating flow of the server computer protection apparatus 503 consistent with an aspect related to the present invention.

After client 101 establishes a connection to server 104 through server computer protection apparatus 503, a set consisting of "number of data requests" measurement unit 506 and response probability calculation unit 510 is allotted to predetermined client 101. Next, server computer protection apparatus 503 awaits a data request from client 101 toward server 104 (stage 600). When the request for data has been made, "number of data requests" measurement unit 203 allotted to client 101 increases by one the number of accepted requests as held in response probability calculation unit 205 which forms the set (stage 602).

Then, data request transfer unit 502 judges the data request from predetermined client 101 as accepted by the data request acceptance unit 201 to determine whether or not the data request may be transferred to server 104 by the data request transfer unit 202 (stage 604). In the judgment at the stage 604, the number of accepted requests which are not completed yet is used.

As the number of data responses within a predetermined time period is closer to the number of data requests accepted within the predetermined time period, that is, as the number of uncompleted accepted requests is smaller, server computer protection apparatus 503 judges that the load of server 104 attributed to the predetermined client 101 is lighter. Conversely, as the number of data responses within the predetermined time period is smaller than the number of data requests accepted within the predetermined time period, that is, as the number of uncompleted accepted requests is larger, server computer protection apparatus 503 judges that server 104 completes a smaller number of processes responsive to the data requests from predetermined client 101 within the predetermined time period. That is, the server's load is heavier. In a case where the load on this occasion is extraordinarily heavy, server computer protection apparatus 503 can judge that server 104 may possibly be under a DoS attack.

For the reasons as stated above, the number of uncompleted accepted requests can be adopted as the load state of server 104 for the decision of the stage 604. This signifies that the number of uncompleted accepted requests is also usable for discriminating if server 104 is under a DoS attack. At stage 604, server computer protection apparatus 503 determines whether or not the new data request from predetermined client 101 may be transferred in accordance with the number of uncompleted accepted requests. When the number of uncompleted accepted requests is small, server 104 can afford to respond and, therefore, server computer protection apparatus 503 judges that the new data request can be transferred.

Conversely, when the number of uncompleted accepted requests is large, server 104 might be under a DoS attack and, therefore, server computer protection apparatus 503 judges that the new data request may need to be annulled.

Further, in addition to accepted and completed responses, criteria explained below can be included in the probability calculation unit 510 calculation of the response probability for data requests that are to be transferred the data request transfer unit 504.

The processing load of server 104 and the occupation of the communication line can also be used for judging that server 104 may possibly be under a DoS attack. Since information indicating a data amount is affixed to communication data from client 101, the data amount of the data response of server 104 to a data request from client 101 can be measured by "number of data supplies" measurement unit 508. If the responsive data amount is large, server 104 expends a high cost in generating response data, i.e. more processing and resource allocation. Moreover, a time period to communicate the response data lengthens, and the occupation time of a communication line in the network increases.

If this criterion is utilized, the data amount of the data response is considered in the judgment at stage 604 as shown in FIG. 6 in which server computer protection apparatus 503 judges whether or not the data request from client 101 as accepted by data request acceptance unit 502 may be transferred to server 104 by data request transfer unit 504.

That is, at stage 604, server computer protection apparatus 503 judges whether or not the new data request from the client 101 may be transferred in accordance with the data amount of the data response. When the data amount is smaller, server 104 can afford to respond and, therefore, server computer protection apparatus 503 judges that the new data request can to be transferred. Conversely, when the data amount is larger, server 104 might be under a DoS attack and, therefore, server computer protection apparatus 503 judges that the new data request may need to be annulled.

Data requests, and data responses to them by server 104 are respectively endowed with corresponding sequence numbers. It is therefore possible to specify which of the data requests a certain data response corresponds to. As another criterion, this information can be included in probability calculation unit 205 calculation of the response probability for data requests that are to be transferred by data request transfer unit 504.

In this case, it is assumed that server 104 has responded to a certain data request from client 101. Assuming that an acknowledgment for the data response has not thereafter been obtained from client 101 for a predetermined time period, server 104 judges that the pertinent data response has not arrived at the client 101, and server 104 attempts to resend the data response. As stated above, "number of data supplies" measurement unit 508 can specify which of the data requests the resent data response corresponds.

By considering this criterion, server computer protection apparatus 503 enables server 104 to reliably communicate with client 101, and determine when client intentionally sends back no acknowledgment. In such a case, server 104 repeats resending limitlessly, and in turn, server 104 is burdened with a useless processing load. Simultaneously, server 104 ties up the communication line on account of the useless resending. Thus, server computer protection apparatus 503 can judge that server 104 may possibly be under a DoS attack.

If this criterion is utilized, the number of times of resending of the data response is considered in the judgment at stage 604 as shown in FIG. 6 in which server computer protection apparatus 503 judges whether or not the data request from client 101 as accepted by data request acceptance unit 502 may be transferred to server 104 by data request transfer unit 504.

That is, at stage 604, whether or not the new data request from client 101 may be transferred is judged in accordance with the number of times of resending of the data response. When the number of times of resending is larger, the possibility of a DoS attack against server 104 is higher, and server computer protection apparatus 503 can judge that the new data request may need to be annulled.

As mentioned above, data request acceptance unit 502 accepts the data request from client 101 as proxy for server 104. When the connection with server 104 as requested by client 101 has been wrongfully cut off, data request acceptance unit 502 can detect the wrongful cutoff. The "wrongful cutoff" signifies cutoff based on the detection of the fact that a normal communication can no longer be kept due to the transmission, flow or the like of, for example, an abnormal command which does not conform to a protocol for use in communication. Also, "wrongful cutoff" includes the reception of a one-sided forced cutoff request or the like from client 101.

When server 104 receives an abnormal command, flow, or the forced cutoff request, the server client network must execute a recovery process of communication resources because the received item is unexpected data. In the presence of any renewed application which is activated in server 104, the server/client network also must perform a renewal cancellation process such as roll-back because of the recovery process. These processes often require server 104 to endure heavy loads. When such abnormal communications are repeated, the load of server 104 increases, and the processing efficiency of the server 104 decreases drastically. Also in this case, server computer protection apparatus 503 can judge that server 104 may possibly be under a DoS attack.

The number of times of the abnormal communications is considered in the judgment at stage 604 as shown in FIG. 6 in which server computer protection apparatus 503 judges whether or not the data request from client 101 as accepted by data request acceptance unit 502 may be transferred to server 104 by data request transfer unit 504.

That is, at stage 604, whether or not the new data request from client 101 may be transferred is judged in accordance with the number of times of the abnormal communications. As the number of times is larger, the possibility of the DoS attack against the server 104 is higher, and, therefore, server computer protection apparatus 503 judges that the new data request is to be annulled.

Accordingly, by setting several criteria as described above, server computer protection apparatus 503 can effectively prevent DoS attack.

In another example, in the calculation of the response probability by the response probability calculation unit 510, response probability calculation unit 510 can include a response probability memory and to consider a value stored in this memory, as described below.

Response probability calculation unit 510 judges the load of server 104 as applied by the corresponding client, on the basis of information items which are acquired from "number of data requests" measurement unit 506, "number of data supplies" measurement unit 508 and data request acceptance unit 502. In this example, a calculated value is not directly converted into the load situation of server 104 for judgment, but the value is referenced to the value stored in the response probability memory of response probability calculation unit 510.

In the calculations of server computer protection apparatus 503, the values obtained from the respective measurement units have been collectively converted into values which indicate load levels of "0" to "10". Depending upon the values obtained from the respective measurement units, the load level of server 104 might violently change from "0" to "10", and the response probability to be calculated can greatly fluctuate.

Therefore, the values obtained from the respective measurement units are collectively converted into a value which falls within a range of ±2. Subsequently, response probability calculation unit 510 adds the value collectively obtained to the value which is stored in the response probability memory. Then, the value fluctuates only within the range of ±2 by one time of measurement, and server computer protection apparatus 503 can suppress the great fluctuation of the response probability as in the above example based on the assumption that the response probability memory holds the values of "0" to "10".

Assuming that the fluctuation of the response probability proceeds too rapidly, the load on server 104 is not constant, and server 104 sometimes becomes unstable.

Accordingly, the aforementioned range of the values which are held in the response probability memory, and the range of the collective values of the values obtained from the respective measurement units are appropriately determined, whereby the fluctuation of the number of data requests arriving at server 104 from client 101 can be relaxed to protect server 104.

Referring again to FIG. 6, when server computer protection apparatus 503 has judged that the new data request from predetermined client 101 is to be transferred to the server 104, data request transfers unit 504 transfers this data request is transferred to server 104 (stage 606). In contrast, if server computer protection apparatus 503 has judged that the new data request is not to be transferred, this data request is annulled from within data request acceptance unit 502, and a new data request from predetermined client 101 is awaited again (stage 600).

When the data request from predetermined client 101 has been transferred to server 104, server 104 issues a response to this data request, and hence, server computer protection apparatus 503 transfers the response to predetermined client 101 (stage 608).

Finally, the number of completed requests is measured in accordance with the response by "number of data supplies" measurement unit 508, and the number of accepted requests as held in response probability calculation unit 510 allotted to the predetermined client 101 is decreased by one (stage 610). If the connection from predetermined client 101 to server 104 is maintained, a similar operating flow is repeated again so as to await a new data request from predetermined client 101 toward server 104 (stage 600).

According to the server computer protection method based on such a flow, the server computer protection apparatus relaxes the influence of the DoS attack as burdens the server and shuts it down, which does not stop the process of the client, and which provides a control for server computer protection as is subtle for each client.

Figure 7:
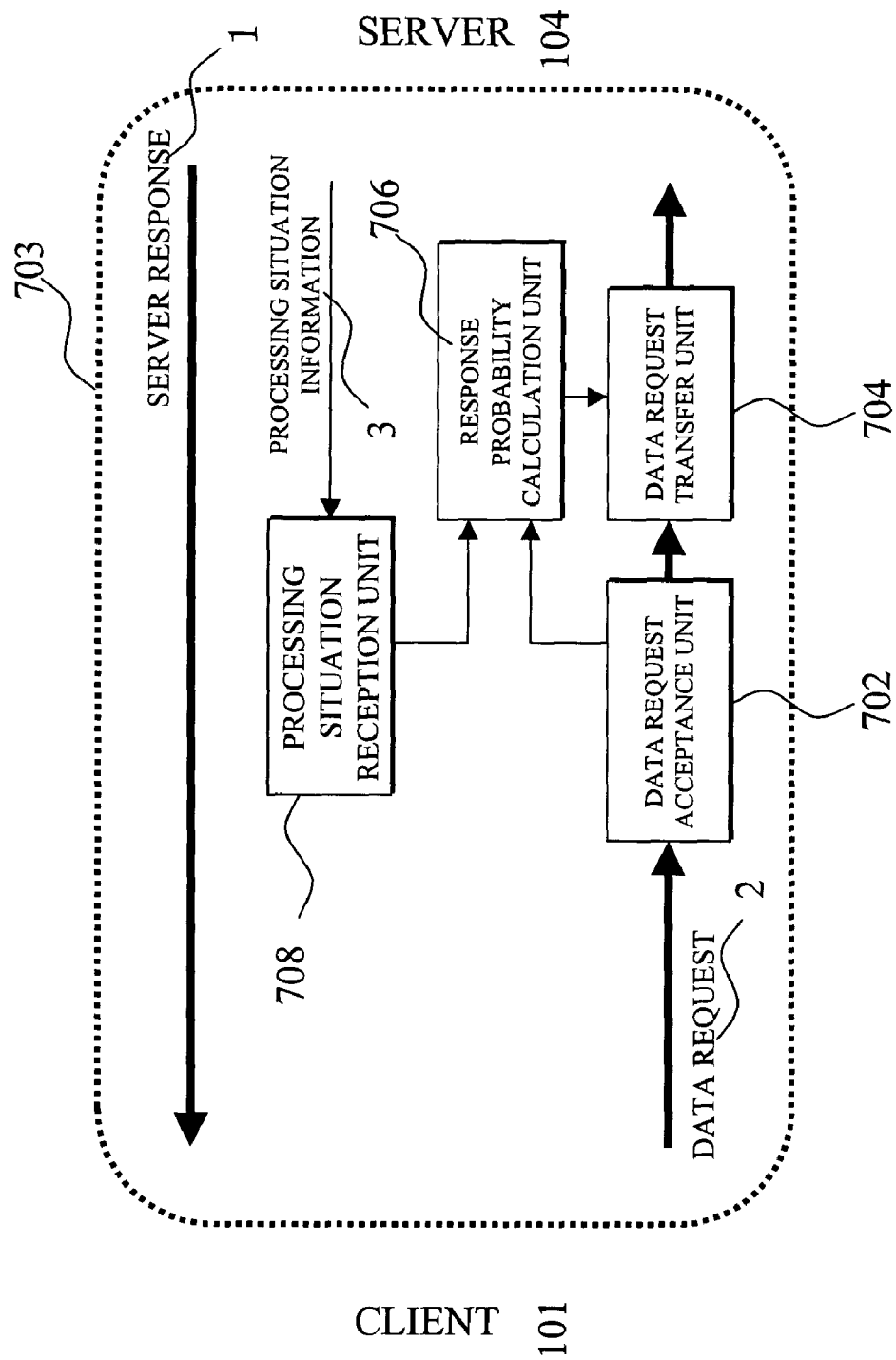
FIG. 7 is a block diagram showing an example of the construction of a server computer protection apparatus consistent with an aspect related to the present invention.

In another aspect related to the present invention, a server computer protection apparatus can receive processing situation information from a server. FIG. 7 shows an example of the construction of server computer protection apparatus 703 consistent with this aspect which is utilized in the network architecture show in FIG. 1. Server computer protection apparatus 703 includes a data request acceptance unit 702, a data request transfer unit 704, a response probability calculation unit 706 and a processing situation reception unit 708.

After client 101 has established its connection with server 104 through server computer protection apparatus 703, client 101 transmits a request for data necessary for a process, to server 104 through server computer protection apparatus 703. On this occasion, the request upon server 104 is accepted by data request acceptance unit 702.

Then, the request accepted by data request acceptance unit 702 is transferred toward server 104 by data request transfer unit 704. In response, server 104 transmits the data corresponding to the transferred request, toward client 101 which made the request, through server computer protection apparatus 703.

Processing situation reception unit 708 receives from server 104, information on the processing situation of server 104 itself. Concretely, the information is, for example, the load situation of server 104 at the transmission. The information which is supplied by server 104 may well contain a proceeding situation of the process of server 104 or the processed result of server 104 which is linked with the data request accepted by data request acceptance unit 702. In this case, the information makes known, for example, that a certain data request and a load applied to server 104 by an application activated for processing the data request are associated with each other.

When the processing situation information acquired from server 104 at a predetermined time interval or at any desired timing is analyzed, server computer protection apparatus 703 can determine the relation between the data request made by client 101 and the load situation of server 104. For example, after a certain data request has been made by client 101, the load of server 104 fluctuates suddenly. If client 101 successively makes data requests and the load of server 104 is suddenly heightened, the processing ability of server 104 will be drastically decreased. In turn, all services offered by server 104 might be stopped. This can mean that server 104 is under a DoS attack from client 101. In order to avoid the shutdown of server 104, the administrator of server 104 must promptly stop requests which are transmitted from clients 101 to server 104.

However, assuming that clients 101 are merely making legal data requests until requests are stopped, the processes of the applications activated in clients 101 are interrupted or disabled by the determination of a required shutdown.

In order to reduce interruption as stated above, response probability calculation unit 706 calculates a response probability on the basis of the processing situation information, at least, each time the information is acquired from server 104. Subsequently, response probability calculation unit 706 supplies the response probability to data request transfer unit 704. The "response probability" termed here signifies the ratio of the number of data responses made within a predetermined time period by server 104, to the number of data requests accepted from clients 101 within the predetermined time period. When the ratio is large, data request transfer unit 704 increases the number of data requests which are to be transferred to server 104 within the predetermined time period, among the data requests accepted within the predetermined time period. Conversely, when the ratio is small, data request transfer unit 202 decreases the number of data requests which are to be transferred to server 104 within the predetermined time period.

Data request acceptance unit 702 annuls data requests which are not transferred by data request transfer unit 704 because the number of requests to be transferred within the predetermined time period has been decreased. Alternatively, data request acceptance unit 702 can retain the data requests. In the case where the data requests are retained without being annulled, a constituent for transferring the retained data requests asynchronously to new data requests is required.

As described above, when the response probability calculation unit 706 judges the load of server 104 is light, from the processing situation information acquired from the server 104, response probability calculation 706 calculates the response probability to be high. When response probability calculation 706 judges the load of the server 104 is heavy, response probability calculation 706 calculates the response probability to be low.

The process provides a server computer protection apparatus which relaxes the influence of the DoS attack as burdens on the server and shuts it down, and which does not stop the process of the client.

Figure 8B:
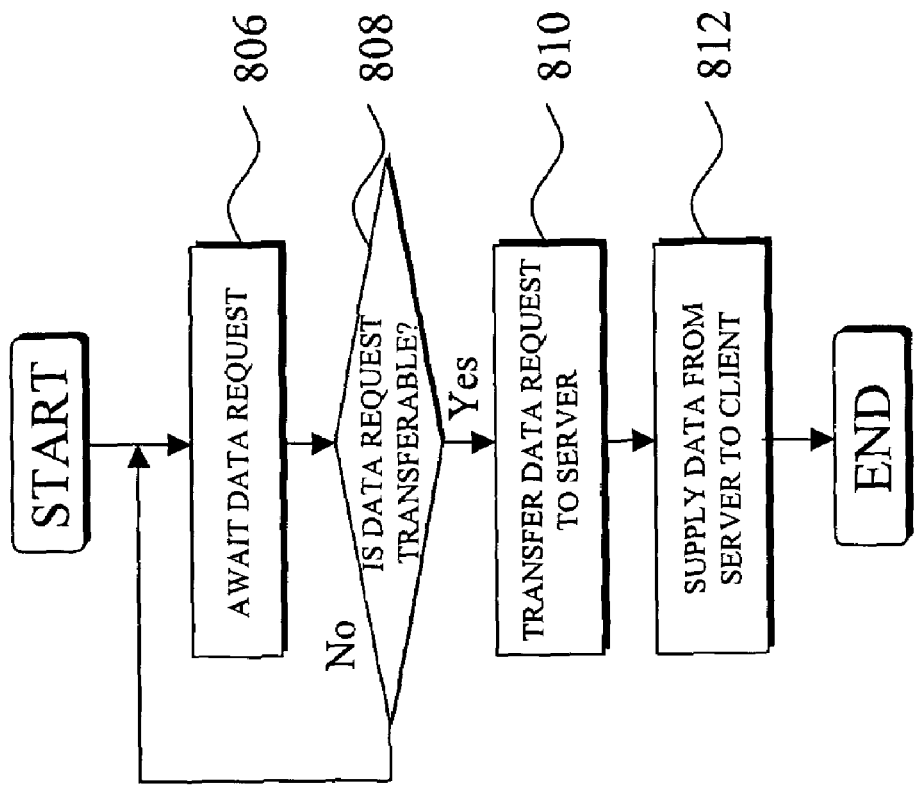
FIGS. 8A and 8B are flow charts each showing an example of the operating flow of the server computer protection apparatus shown in FIG. 7.
Figure 8A:
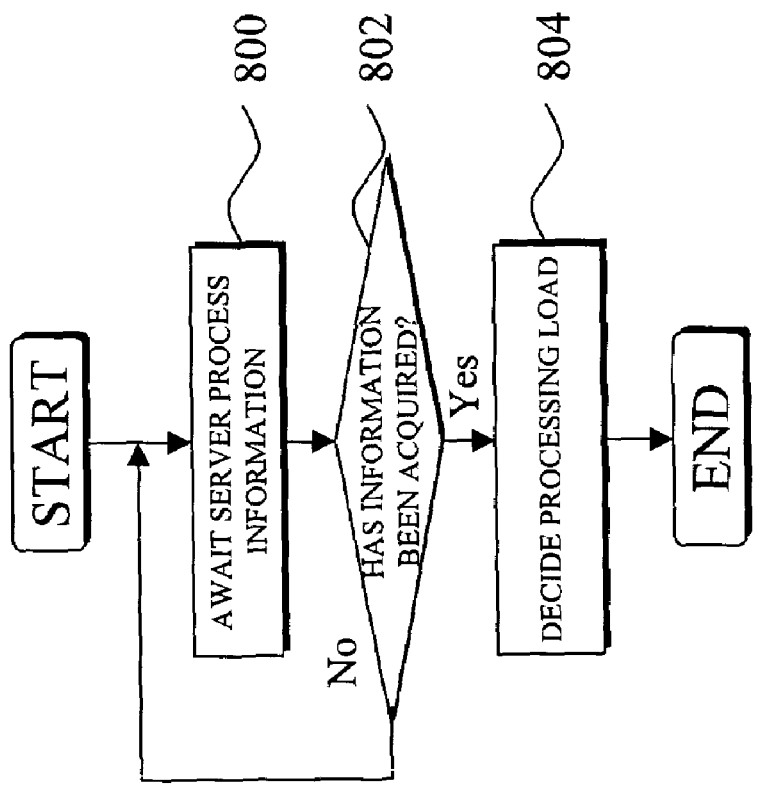

FIGS. 8A and 8B show examples of the operating flows of server computer protection apparatus 703 consistent with an aspect related to the present invention.

The flow shown in FIG. 8A is for acquiring processing situation information from server 104. On the other hand, FIG. 8B shows the flow in which a data request is accepted from client 101 and is delivered to server 104. The two flows are processed asynchronously.

First, as illustrate in FIG. 8A, in order to acquire from server 104 the information on the server process, processing situation reception unit 708 awaits the transmission of the information (stage 800). Subsequently, server computer protection apparatus 703 determines whether or not the information has been normally acquired (stage 802). In a case where the information has been normally acquired, processing situation reception unit 708 decides the processing load of server 104 (stage 804). The process shown in FIG. 8A is executed each time the processing situation information is acquired from server 104, and the situation of the processing load of server 104 is determined in real time.

In a case where the processing situation information has not been acquired at stage 802, server computer protection apparatus 703 awaits the transmission of the information (stage 800).

Next, FIG. 8B will be described.

After the connection has been established from client 101 to server 104 through server computer protection apparatus 703, a data request from client 101 toward server 104 is awaited (stage 806).

The data request from client 101 as accepted by data request acceptance unit 702 is judged as to whether or not it may be transferred to server 104 by data request transfer unit 704 (stage 808). In the judgment at stage 808, the processing load of server 104 as decided by processing situation reception unit 708 is used. When the load is low, server 104 can afford to respond, and server computer protection apparatus 703 judges that the new data request can be transferred. Conversely, when the load is higher, server 104 might be under a DoS attack, and server computer protection apparatus 703 judges that the new data request may need to be annulled.

Further, in addition to load data, criteria explained below can be included in response probability calculation unit 706 calculation of the response probability for data requests that are to be transferred by data request transfer unit 704.

When the processing situation information items of server 104 are derived in succession, a feature can be found in a data request and the load of server 104 in some cases. For example, after a certain data request has been accepted by data request acceptance unit 702 and transferred by data request transfer unit 704, the load of the process of server 104 rises suddenly.

When such a sudden rise has been found, server computer protection apparatus 703 can judge that the server 104 may possibly be under a DoS attack.

Whether or not the tendency for a sudden rise of the processing load is considered in the judgment at stage 808. As shown in FIG. 8B, server computer protection apparatus 703 judges whether or not the data request from client 101 as accepted by data request acceptance unit 702 may be transferred to server 104 by data request transfer unit 704.

That is, at stage 808, server computer protection apparatus 703 judges whether or not the new data request from client 101 may be transferred in consideration of the tendency of the load. If a sudden rise of the load is found, there is the possibility that server 104 will be under a DoS attack, and server computer protection apparatus 703 judges that the new data request may need to be annulled.

Conversely, the load of server 104 sometimes lowers suddenly as soon as a certain data request from client 101 is canceled. When the processing load lowers suddenly, server computer protection apparatus 703 can judge that server 104 may possibly have been under the DoS attack.

Whether or not the tendency to the sudden lowering of the processing load is also considered in the judgment at stage 808. As shown in FIG. 8B, server computer protection apparatus 703 judges whether or not the data request from client 101 as accepted by data request acceptance unit 702 may be transferred to server 104 by data request transfer unit 704.

That is, at stage 808, server computer protection apparatus 703 judges whether or not the new data request from client 101 may be transferred in consideration of the tendency of the load. If a sudden lowering of the load is found, there is the possibility that server 104 will have been under a DoS attack, and server computer protection apparatus 703 judges that a new data request is to be annulled without being easily accepted.

In another example, in the calculation of the response probability by response probability calculation unit 706, response probability calculation unit 706 can include a response probability memory and consider a value stored in this memory, as described below.

Response probability calculation unit 706 judges the load of server 104 on the basis of the processing situation information of server 104 as received by processing situation reception unit 708. In this example, a calculated value is not directly converted into load situation of server 104 for judgment, but the value is referenced to the value stored in the response probability memory of response probability calculation unit 706.

In the calculation of server computer protection apparatus 703, the values obtained from the units 702 and 708 have been collectively converted into values which indicate load levels of "0" to "10". Depending upon the values obtained from the respective units, the load level of server 104 might violently change from "0" to "10", and the response probability to be calculated can greatly fluctuate.

Therefore, the values obtained from the respective units 702 and 708 are collectively converted into a value which falls within a range of ±2. Subsequently, response probability calculation unit 706 adds the value collectively obtained to the value which is stored in the response probability memory. Then, the value fluctuates only within the range of ±2 by one time of measurement, and server computer protection apparatus 703 suppresses the great fluctuation of the response probability as in the above example based on the assumption that the response probability memory holds the values of "0" to "10".

Assuming that the fluctuation of the response probability proceeds too rapidly, the load on server 104 is not constant, and server 104 sometimes becomes unstable.

Accordingly, the aforementioned range of the values which are held in the response probability memory, and the range of the collective values of the values obtained from respective units 702 and 708 are appropriately determined, whereby the fluctuation of the number of data requests arriving at server 104 from client 101 can be relaxed to protect server 104.

Referring again to FIG. 8, when server computer protection apparatus 703 has judged that the new data request from client 101 is to be transferred to server 104, data request transfer unit 704 transfers this data request to server 104 (stage 810). In contrast, when server computer protection apparatus 703 has judged that the new data request is not to be transferred, this data request is annulled from within data request acceptance unit 702, and a new data request from client 101 is awaited again (stage 806).

When the data request from client 101 has been transferred to server 104, server 104 subsequently issues a response to this data request, and hence, server computer protection apparatus 703 transfers the response to client 101 (stage 812).

If the connection from client 101 to server 104 is maintained, a similar operating flow is repeated again so as to await a new data request from client 101 toward server 104 (stage 806).

According to the server computer protection method based on such a flow, the server computer protection apparatus relaxes the influence of the DoS attack as burdens the server and shuts it down, and does not stop the process of the client.

Figure 9:
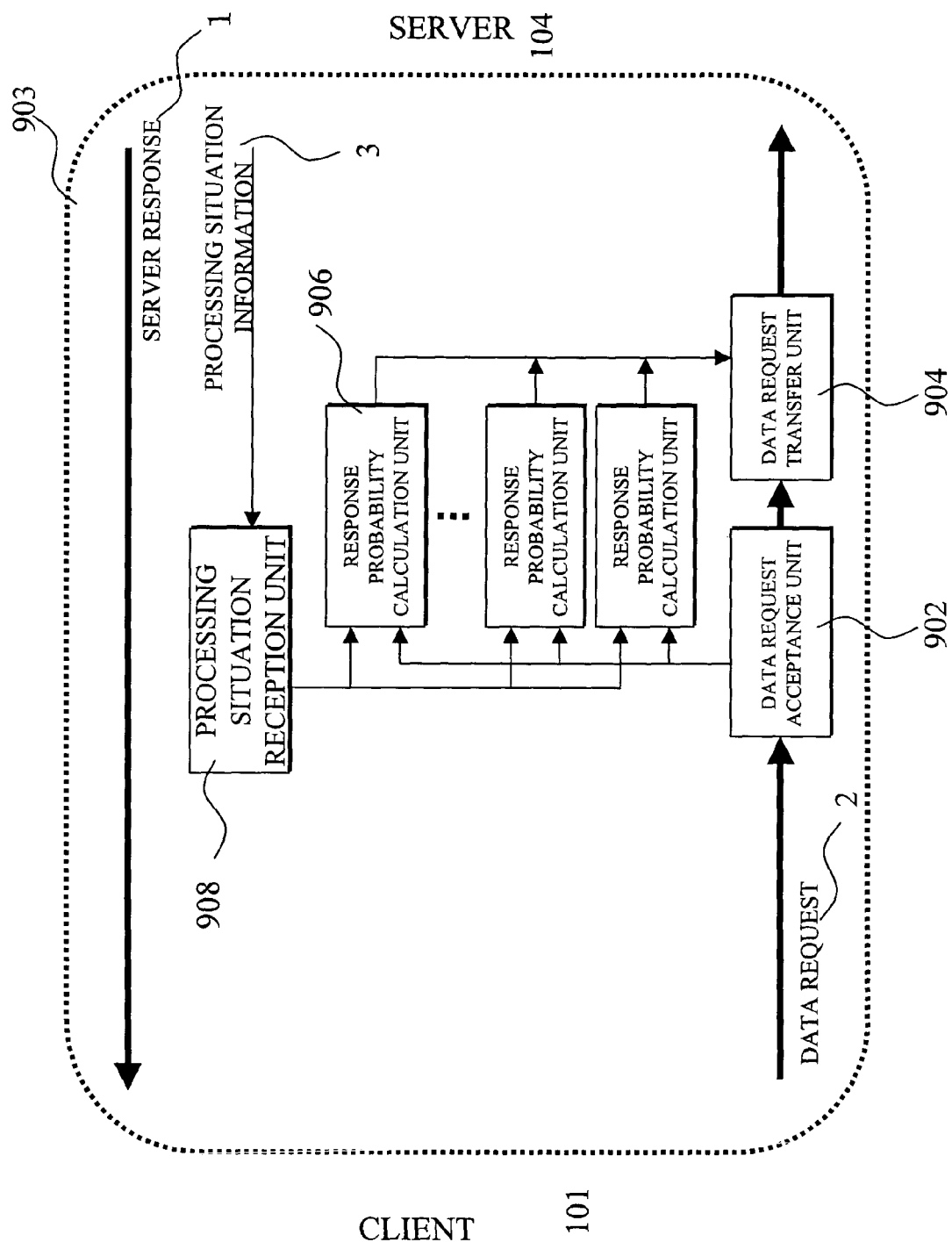
FIG. 9 is a block diagram showing an example of the construction of a server computer protection apparatus consistent with an aspect related to the present invention.

In another aspect related to the present invention a server computer protection apparatus can receive processing situation information for a server in relation to each client. FIG. 9 shows an example of the construction of server computer protection apparatus 903 consistent with this aspect which is utilized in the network architecture shown in FIG. 1. Server computer protection apparatus 903 includes a data request acceptance unit 902, a data request transfer unit 904, response probability calculation units 906 and a processing situation reception unit 908.

Server computer protection apparatus 903 differs form server computer protection apparatus 703 in a plurality of response probability calculation units 906 are included. The plurality of measurement units process the transfers of data requests transmitted from the plurality of clients 101 (for example, clients 101-1, 101-2, 101-3), in correspondence with the respective clients.

In order to separately execute the processes of the each client, server computer protection apparatus 903 can discriminate which clients have transmitted the requests to be processed. Server computer protection apparatus 903 discriminates the clients by referring to IP addresses in the header information of packets that are contained in the data requests transmitted from the respective clients which indicate transmission sources. Server computer protection apparatus 903 discriminates a server response by referring to an IP address in the header information of packets that are contained in the server response which indicates a destination.

The components of server computer protection apparatus 903 function similarly to the component of server computer protection apparatus 703.

Figure 10B:
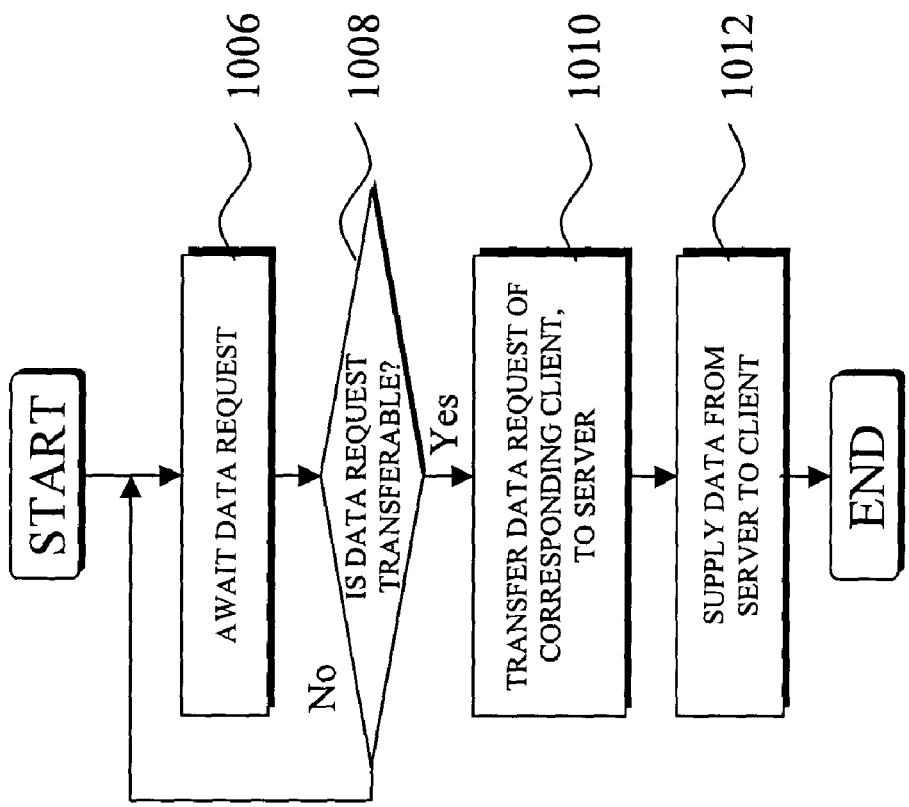
FIGS. 10A and 10B are flow charts each showing an example of the operating flow of the server computer protection apparatus shown in FIG. 9.
Figure 10A:
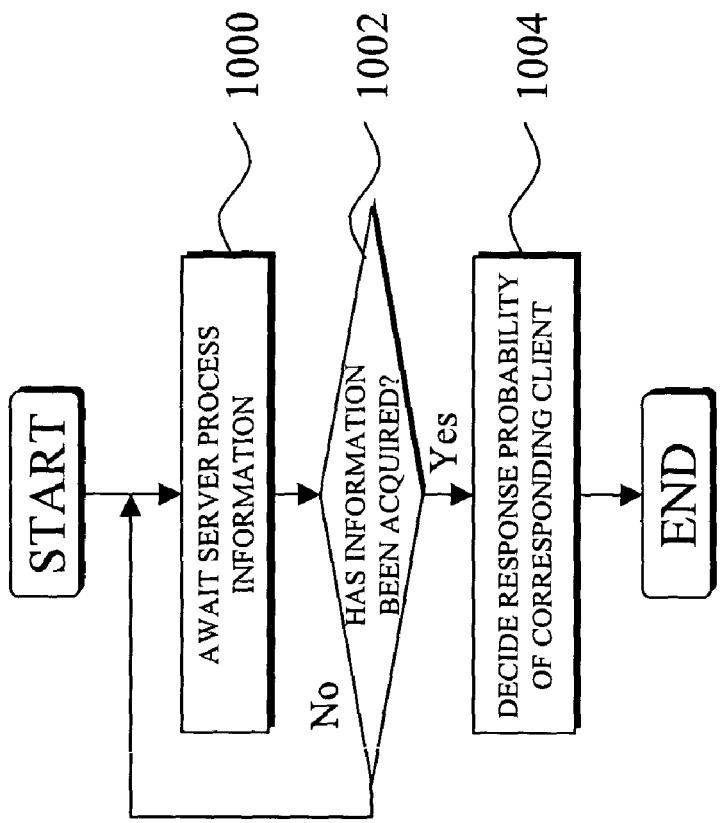

FIGS. 10A and 10B show examples of the operating flows of server computer protection apparatus 903 consistent with an aspect related to the present invention.

The flow shown in FIG. 10A is for acquiring processing situation information from server 104. On the other hand, FIG. 10B shows the flow in which a data request is accepted from client 101 and is delivered to server 104. The two flows are processed asynchronously.

First, as shown in FIG. 10A, in order to acquire from server 104 the information on the server process, the processing situation reception unit 908 awaits the transmission of the information (stage 1000). Subsequently, server computer protection apparatus 903 determines whether or not the information has been normally acquired (stage 1002). In a case where the information has been normally acquired, processing situation reception unit 908 decides the processing load of server 104 for each client and every client (stage 1004). The process shown in FIG. 10A is executed each time the processing situation information is acquired from server 104, and the situation of the processing load of server 104 as applied by each client is determined in real time.

In a case where the processing situation information has not been acquired at stage 1002, server computer protection apparatus 903 awaits the transmission of the information (1000).

Next, FIG. 10B will be described.

After the connection has been established from client 101 to server 104 through server computer protection apparatus 903, and response probability calculation unit 906 has been allotted to a particular client 101, server computer protection apparatus 903 awaits a data request from the client 101 toward the server 104 (stage 1006).

The data request from predetermined client 101 as accepted by the data request acceptance unit 902 is judged as to whether or not it may be transferred to server 104 by the data request transfer unit 904 (stage 1008). In the judgment at stage 1008, the processing load of server 104 as decided by processing situation reception unit 908 is used. When the load is low, server 104 can afford to respond to a particular client 101, and server computer protection apparatus 903 judges that the new data request can be transferred. Conversely, when the load is high, there is the possibility that server 104 will be under a DoS attack from the particular client, and server computer protection apparatus 903 judges that the new data request may need to be annulled.

Further, in addition to load data, criteria explained below can be included in response probability calculation unit 906 calculation of the response probability for data requests that are to be transferred by data request transfer unit 904.

When the processing situation information items of server 104 are derived in succession, a feature can be found in data requests from predetermined clients and the load of server 104 in some cases. For example, where, after a certain data request has been accepted by data request acceptance unit 902 and transferred by data request transfer unit 904, the load of the process of server 104 rises suddenly.

When such a sudden rise has been found, server computer protection apparatus 903 can judge that server 104 may possibly be under a DoS attack.

Whether or not the tendency for a sudden rise of the processing load is considered in the judgment at stage 1008. As shown in FIG. 9B, server computer protection apparatus 903 judges whether or not the data request from client 101 as accepted by data request acceptance unit 902 may be transferred to server 104 by data request transfer unit 904.

That is, at stage 1008, server computer protection apparatus 903 judges whether or not the new data request from client 101 may be transferred in consideration of the tendency of the load. If a sudden rise of the load is found for a predetermined client, there is the possibility that server 104 will be under a DoS attack from that client, and server computer protection apparatus 903 judges that the new data request from that client may need to be annulled.

Conversely, the load of server 104 sometimes lowers suddenly as soon as a certain data request from client 101 is canceled. When the processing load lowers suddenly for a predetermined client, server computer protection apparatus 903 can judge that server 104 may possibly have been under a DoS attack from that client.

Whether or not the tendency to the sudden lowering of the processing load is also considered in the judgment at stage 1008. As shown in FIG. 10B, server computer protection apparatus 903 judges whether or not the data request from client 101 as accepted by data request acceptance unit 902 may be transferred to server 104 by data request transfer unit 904.

That is, at stage 1008, server computer protection apparatus 903 judges whether or not the new data request from client 101 may be transferred in consideration of the tendency of the load. If a sudden lowering of the load is found, there is the possibility that server 104 will have been under a DoS attack from that client, and server computer protection apparatus 903 judges that a new data request from that client is to be annulled without being easily accepted.

In another example, in the calculation of the response probability by response probability calculation unit 906, response probability calculation unit 906 can include a probability memory and consider a value stored in this memory, as described below.

Response probability calculation unit 906 judges the load of server 104 as applied by the corresponding client, on the basis of the processing situation information of server 104 as received by processing situation reception unit 908. In this example, a calculated value is not directly converted into the load situation of server 104 for judgment, but the value is referenced to the value stored in the response probability memory of response probability calculation unit 906.

In the calculation of server computer protection apparatus 903, values obtained from units 902 and 908 have been collectively converted into values which indicate load levels of "0" to "10". Depending upon the values obtained from the respective units, the load level of the server 104 might violently change from "0" to "10", and the response probability to be calculated can greatly fluctuate.

Therefore, the values obtained from the respective units 902 and 908 are collectively converted into a value which falls within a range of ±2. Subsequently, response probability calculation unit 906 adds the value collectively obtained to the value which is stored in the response probability memory. Then, the value fluctuates only within the range of ±2 by one time of measurement, and server computer protection apparatus 903 can suppress the great fluctuation of the response probability as in the above example based on the assumption that the response probability memory holds the values of "0" to "10".

Assuming that the fluctuation of the response probability proceeds too rapidly, the load on server 104 is not constant, and server 104 sometimes becomes unstable.

Accordingly, the aforementioned range of the values which are held in the response probability memory, and the range of the collective values of the values obtained from the respective units 902 and 908 are appropriately determined, whereby the fluctuation of the number of data requests arriving at server 104 from client 101 can be relaxed to protect server 104.

Referring again to FIG. 9, when server computer protection apparatus 903 has judged that the new data request from predetermined client 101 is to be transferred to server 104, data request transfer unit 904 transfers this data request to server 104 (stage 1010). In contrast, when server computer protection apparatus 903 has judged that the new data request is not to be transferred, this data request is annulled from within the data request acceptance unit 902, and a new data request from predetermined client 101 is awaited again (stage 1006).

When the data request from predetermined client 101 has been transferred to server 104 server 104, subsequently issues a response to this data request, and hence, server computer protection apparatus 903 transfers the response to predetermined client 101 (stage 1012).

If the connection from predetermined client 101 to server 104 is maintained, a similar operating flow is repeated again so as to await a new data request from predetermined client 101 toward server 104 (stage 1006).

According to the server computer protection method based on such a flow, the server computer protection apparatus relaxes the influence of the DoS attack as burdens the server and shuts it down, which does not stop the process of the client, and which provides a control for server computer protection as is subtle for each client.

As a modification to each aspect, a server 104 can incorporate the server computer protection apparatus 103, 503, 703, or 903 according to each aspect. Owing to such incorporation, it is unnecessary to separately and individually build server 104 which processes data requests from clients 101, and the server computer protection apparatus which is disposed for the purpose of protecting server 104 against DoS attacks from unspecified clients 101. Therefore, the communication between server computer protection apparatus and server 104 need not be performed through a network or the like.

With the server computer protection apparatus so incorporated, a time period having been required for the communication of each proxy response can be excluded. Further, when compared with server 104 protected by a server computer protection apparatus as requiring a plurality of enclosures, server 104 with the server computer protection apparatus incorporated therein can reduce a space necessary for installation because the same function will be attainable with a single enclosure.

Other aspect related to the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A server computer protection apparatus for protecting a server computer against attacks, comprising:
    a data request acceptance unit configured to accept data requests sent from client computers coupled to the server computer via the protection apparatus, as proxy for the server computer which is different and separate from the protection apparatus;
    at least one request measurement unit configured to measure a number of data requests which have arrived from said client computers within a predetermined time period;
    a response measurement unit configured to measure a number of responses which have been made from said server computer to said client computers within the predetermined time period;
    at least one server load calculation unit configured to obtain a load state of said server computer by using measurements of said request measurement unit and said response measurement unit; and
    a data request transfer unit configured to change a rate of the number of data requests based on the load state determined by said server load calculation unit,
    wherein said server load calculation unit is configured to store said load state of said server computer;
    wherein said server load calculation unit chances the value stored in accordance with a new load state of said server computer;
    wherein, as said changed value exhibits a higher load, the rate of said number of the data requests which are to be transferred to said server computer is decreased by said data request transfer unit; and
    wherein, as said changed value exhibits a lower load, the rate of said number of the data requests which are to be transferred to said server computer is increased by said data request transfer unit.

2. The server computer protection apparatus as set forth in claim 1, wherein said server load calculation unit determines the load state from at least the number of data requests which are to be transferred to said server computer within said predetermined time period, relative to the number of data requests which have been accepted by said data request acceptance unit within said predetermined time period.

3. The server computer protection apparatus as set forth in claim 2, wherein
    in a case where said data request transfer unit has judged that a load of said server computer increases from said load state of said server computer as obtained by said server load calculation unit, the rate of said number of the data requests which are to be transferred to said server computer is decreased; and
    in a case where said data request transfer unit has judged that the load of said server computer decreases, the rate of said number of the data requests which are to be transferred to said server computer is increased.

4. The server computer protection apparatus as set forth in claim 2,
    wherein the response measurement unit is configured to measure size of the responses made from said server computer to said client computer within said predetermined time period;
    wherein said server load calculation unit determines the load state from the size of the responses made from said server computer and as the measured size of the responses increases, the load is calculated to be higher by said server load calculation unit.

5. The server computer protection apparatus as set forth in claim 2,
    wherein said response measurement unit is configured to detect that the response from said server computer to said client computer has been resent;
    wherein said server load calculation unit determines the load state from the detection, and, when said response measurement unit has detected a resending, the load of said server computer which has resent said response to the data request of said client computer is calculated to have become higher by said server load calculation unit.

6. A server computer protection apparatus as set forth in claim 2,
    wherein said data request acceptance unit is configured to detect if said client computer has been forcibly cut off and to detect if any abnormality in a communication state exists;
    wherein the said server load calculation unit determines the load state from detected state and, when said data request acceptance unit has detected a forced cut off or an abnormal communication, the load of said server computer as corresponds to said client computer is calculated to have become higher by said server load calculation unit.

7. The server computer protection apparatus as set forth in claim 2,
    wherein said response measurement unit is configured to detect a new connection from said client computer;
    wherein said server load calculation unit determines the load state from the detected new connection and, when said response measurement unit has not detected a new connection within said predetermined time period, the load of said server computer as corresponds to said client computer is calculated by said server load calculation unit to have become lower.

8. A server computer protection method used in a protection apparatus for protecting a server computer, comprising:
    accepting data requests sent from client computers coupled to the server computer via the protection apparatus, as proxy for the server computer which is different and separate from the protection apparatus;
    measuring a number of data requests which have arrived from said client computers within a predetermined time period;
    measuring a number of responses which have been made from said server computer to said client computers within the predetermined time period;
    obtaining a load state of said server computer by using the number of the data requests and the number of the responses; and
    changing a rate of the number of data requests based on the obtained load state;
    changing a prestored value in accordance with the obtained load state of said server computer as corresponds to said client computer;
    lowering the rate of said number of the data requests which are to be transferred to said server computer as the stored value exhibits a higher load; and
    raising the rate of said number of the data requests as said stored value exhibits a lower load.

9. The server computer protection method as set forth in claim 8, wherein
    obtaining the load state from at least the number of data requests which are to be transferred to said server computer within said predetermined time period, relative to the number of data requests which have been accepted within said predetermined time period.

10. The server computer protection method as set forth in claim 8, wherein changing the rate comprises:
    lowering the rate of said number of the data requests which are to be transferred to said server computer when a load of said server computer has become higher than the obtained load state of said server computer; and
    increasing the rate of said number of the data requests which are to be transferred to said server computer when a load of said server computer has become lower than the obtained load state of said server computer.

11. The server computer protection method as set forth in claim 9, further comprising:
    measuring the size of the responses made from said server computer to said client computer within said predetermined time period;
    obtaining the load state based on the size of the responses made from said server computer; and
    raising the rate of said number of the data requests as said stored value exhibits a lower load.

12. The server computer protection method as set forth in claim 9, further comprising:
    detecting that the response from said server computer to said client computer has been resent; and
    obtaining the load state based on the resent detection,
    wherein, when the response is resent, the load of said server is increased.

13. A server computer protection method as set forth in claim 9, further comprising:
    detecting if said client computer has been forcibly cut off and detecting if any abnormality in a communication state exists; and
    obtaining the load state based on the detected communication state,
    wherein, when the communication state is a forced cut off or an abnormal communication, the load of said server computer is increased.

14. The server computer protection method as set forth in claim 9, further comprising:
    detecting a new connection from said client computer; and
    obtaining the load state based on the detected new connection,
    wherein, the load of said server decreases when a new connection is detected within said predetermined time period.

* * * * *